United States Patent
Komatsu et al.

[11] Patent Number: 6,166,878
[45] Date of Patent: Dec. 26, 2000

[54] DISK DRIVE HAVING THE MOTOR CORE SECURED VIA THE DISK ROTATING BEARING FLANGE TO THE CHASSIS

[75] Inventors: Hisateru Komatsu, Tendo; Makoto Takahashi, Obanazawa, both of Japan

[73] Assignee: Mitsumi Electric Co., Ltd., Tokyo, Japan

[21] Appl. No.: 09/234,159

[22] Filed: Jan. 21, 1999

[30] Foreign Application Priority Data

Jan. 22, 1998 [JP] Japan ................................ 10-010107

[51] Int. Cl.⁷ .................................................... G11B 5/016
[52] U.S. Cl. .......................................................... 360/99.04
[58] Field of Search ............................. 360/98.07, 99.04, 360/99.08

[56] References Cited

U.S. PATENT DOCUMENTS 5,877,917  3/1999  Nishizawa ........................... 360/99.04

FOREIGN PATENT DOCUMENTS 9-91814  4/1997  Japan .
9-91866  4/1997  Japan .
9-91943  4/1997  Japan .

Primary Examiner—A. J. Heinz
Attorney, Agent, or Firm—Frishauf, Holtz, Goodman, Langer & Chick, P.C.

[57] ABSTRACT

A motor for rotating a disk has a stator assembled on a motor chassis 50. The stator comprises a core assembly including a plurality of stator cores extending in a radial direction, stator coils each of which is wound around each of the stator coils, and a bearing unit 42-3 having a cylindrical shape for supporting a rotation shaft of the motor. The bearing unit has a flange portion 42-3a formed at its lower part. The flange portion is interposed between an attaching element 55-1 and the motor chassis. The core assembly and the bearing unit are fixed to the motor chassis by screws 56 inserted through the attaching element and the flange portion.

3 Claims, 7 Drawing Sheets

DISK DRIVE HAVING THE MOTOR CORE SECURED VIA THE DISK ROTATING BEARING FLANGE TO THE CHASSIS

BACKGROUND OF THE INVENTION

The present invention relates to a disk drive for use in recording and reproducing data on a disk-shaped recording medium such as a magnetic disk and, in particular, to a carriage mechanism of the disk drive.

Referring to FIGS. 1 through 3, a conventional magnetic disk drive designed for magnetic disks will be described. Such a magnetic disk drive is disclosed in, for example, Japanese Patent Laid-Open (JP-A) No. 9-91943. In the magnetic disk drive illustrated in FIG. 1, a reception mechanism and an ejection mechanism for receiving and ejecting a magnetic disk, respectively, are omitted for clarity of illustration. A chassis 10 comprises a pair of side walls 10-1 on both sides thereof. All components and parts are mounted on a principal surface of the chassis 10. A main printed wiring board 11 and a subsidiary printed wiring board 20 are fixed by screws to the principal surface of the chassis 10. For the main printed wiring board 11, two support members 10-2 (FIG. 2) are formed integrally with the chassis 10 by cutting and rising corresponding portions of a principal plate of the chassis 10. The main printed wiring board 10 is fixed onto the support members 10-2 by the use of screws 12.

A stepping motor 13 is attached to a rear wall 10-3 at a rear end of the chassis 10. An output shaft 13-1 of the stepping motor 13 penetrates through the rear wall 10-3. The output shaft 13-1 has a top end rotatably supported by a shaft receptacle 10-4 integrally formed with the chassis 10 by cutting and rising a corresponding portion of the principal plate of the chassis 10. The output shaft 13-1 has a threaded outer peripheral surface. A carriage mechanism 14 is provided with an arm 14-1 with a pin 14-2 embedded therein. The pin 14-2 is engaged with the threaded outer surface of the output shaft 13-1. With this structure, rotation of the output shaft 13-1 brings about the movement of the carriage mechanism 14 in the same direction as the output shaft 13-1. On the carriage mechanism 14, magnetic heads are mounted for access to the magnetic disk. The carriage mechanism 14 serves to move the magnetic heads in the radial direction of the magnetic disk.

The carriage mechanism 14 is provided with a U-shaped bearing arm 14-3 formed on the side opposite to the arm 14-1. A guide bar 15 penetrates through the bearing arm 14-3. The guide bar 15 is held by a guide bar clamp 16. With this structure, the carriage mechanism 14 is guided by the guide bar 15 during the movement following the rotation of the output shaft 13-1. The guide bar clamp 16 is fixed by a screw to a support plate 10-5 (FIG. 2). The support plate 10-5 is formed integrally with the chassis 10 by cutting and rising a corresponding portion of the principal plate of the chassis 10, and projects upward through a hole formed in the main printed wiring board 11.

In FIG. 3, a motor 21 for rotating the magnetic disk and other circuit components (not shown) are mounted on a subsidiary printed wiring board 20 only on the upper surface thereof. Accordingly, the subsidiary printed wiring board 20 is fixed to the principal plate of the chassis 10 by the screws 12 (FIG. 1) to be substantially in contact therewith at the position closer to a slot for the magnetic disk, i.e., to a front bezel 17.

The structure of the motor 21 will briefly be described. The motor 21 comprises a rotation shaft 21-1, a center metal 21-2, a plurality of cores 21-3, a plurality of stator coils 21-4, a ring-shaped permanent magnet 21-5, and a circular casing 21-6 attached to the rotation shaft 21-1. The center metal 21-2 has a cylindrical shape and serves as a bearing. Each of the cores 21-3 radially outwardly extends from the center. Each of the stator coils 21-4 is wound around an end portion of each corresponding core 21-3. The permanent magnet 21-5 surrounds these cores 21-3. The casing 21-6 holds the permanent magnet 21-5. When the rotation shaft 21-1 is rotated, the permanent magnet 21-5 and the casing 21-6 rotate together with the rotation shaft 21-1. A reference numeral 21-7 depicts an index magnet. A combination of the cores 21-3 and the stator coils 21-4 serves as a stator of the motor 21. A combination of the permanent magnet 21-5 and the casing 21-6 serves as a rotor of the motor 21. The stator and the rotor of the type are disclosed in, for example, Japanese Patent Laid-Open (JP-A) No. 9-91866 and, therefore, will not be described herein in detail.

Referring to FIGS. 4 and 5, a core assembly is formed by a plurality of stator cores 21-3 radially outwardly extending from an outer periphery of a ring-shaped member 21-3L (FIG. 4) of metal. The ring-shaped member 21-3L has an inner diameter greater than the outer diameter of the center metal 21-2 (FIG. 5). The ring-shaped member 21-3L is provided with a pair of attaching elements 21-3a formed on its inner periphery at positions opposite to each other and extending towards the center metal 21-2 (FIG. 5). Each of the attaching elements 21-3a has an end provided with an arc-shaped portion having the diameter substantially equal to the outer diameter of the center metal 21-2.

Referring back to FIG. 3, the casing 21-6 has a protruding portion formed at its center and a flat portion 21-6a formed on an upper surface of the protruding portion. To the flat portion 21-6a, a disk table 21-8 formed by a plastic magnet is integrally fixed. The flat portion 21-6a is provided with an arm 22 attached to a bottom surface thereof. A drive roller 23 is rotatably mounted on the arm 22. Each of the flat portion 21-6a and the disk table 21-8 has a generally rectangular hole formed therein. Through these holes, the drive roller 23 projects upward from the disk table 21-8. The magnetic disk received in the magnetic disk drive is placed on the disk table 21-8. The drive roller 23 is inserted in and engaged with a hole formed in a hub of the magnetic disk. Thus, the magnetic disk is rotated following the rotation of the rotor. The disk table 21-8 is disclosed in, for example, Japanese Patent Laid-Open (JP-A) No. 9-91814 and is not described in detail herein.

Above the motor 21, an eject plate 24 and a disk holder unit 25 are incorporated as the ejection mechanism the reception mechanism for the magnetic disk, respectively. The eject plate 24 and the disk holder unit 25 are also disclosed in the above-mentioned Japanese Patent Laid-Open (JP-A) No. 9-91814 or 9-91943. The chassis 10 is coupled with a cover plate 18 to protect an internal space inside the chassis 10.

Next referring to FIG. 5, assembling of the stator will be described. The center metal 21-2 has a flange portion 21-2a formed at its lower part. The chassis 10 is provided with an opening 10-9 having the size corresponding to the cylindrical portion of the center metal 21-2. The subsidiary printed wiring board 20 is provided with an opening having the size corresponding to the flange portion 21-2a. Each of the attaching elements 21-3a of the core assembly and the subsidiary printed wiring board 20 is provided with a pair of holes for receiving screws 31 inserted therethrough while the chassis 10 is provided with threaded holes to be engaged with the screws 31.

The assembling is carried out as follows. At first, the lower part of the center metal 21-2 is inserted into the opening 10-9 of the chassis 10 and is caulked at the edge of the opening 10-9 to tightly fix the center metal 21-2 to the chassis 10. Then, the subsidiary printed wiring board 20 is placed on the chassis 10 and positioned so that the center of the opening of the subsidiary printed wiring board 20 coincides with the center of the center metal 21-2. In this state, the attaching elements 21-3a of the core assembly are stacked with a ring-shaped spacer 30 interposed therebetween. Then, the chassis 10, the subsidiary printed wiring board 20, and the core assembly are integrally assembled by the screws 31. The spacer 30 also serves to position the core assembly in a vertical direction. Since the center metal 21-2 is fixed by caulking at its lower part as described above, the conventional stator requires a long assembling time. Also, it takes a long time to position the subsidiary printed wiring board 20 and the core assembly with respect to the center of the center metal 21-2.

SUMMARY OF THE INVENTION

It is therefore an object of the present invention to provide a disk drive which is simplified in assembling process of a stator to a chassis.

A disk drive according to the present invention comprises a reception mechanism for receiving a disk on which data are recorded, an ejecting mechanism for ejecting the disk that has been received, a carriage mechanism which has a head unit for accessing to the disk and which holds the head unit so that the head unit is movable in a radial direction of the disk, a moving mechanism for moving the carriage mechanism, a disk table for holding and rotating the disk, and a drive motor for rotating the disk table.

The motor comprises a rotor having a rotation shaft and a stator assembled on a motor chassis of metal and combined with the rotor. The stator is assembled on the motor chassis through a printed circuit board mounted on the motor chassis. The stator comprises a core assembly including a plurality of stator cores extending in a radial direction and stator coils each of which is wound around each of the stator cores. The stator further comprises a bearing unit of metal having a cylindrical shape for supporting the rotation shaft. The bearing unit has a flange portion formed at its lower part. The flange portion is interposed between a part of the core assembly and the motor chassis. The core assembly and the bearing unit are fixed to the motor chassis by a screw inserted through the part of the core assembly and the flange portion into the motor chassis.

DESCRIPTION OF THE PREFERRED EMBODIMENT

Figure 6:
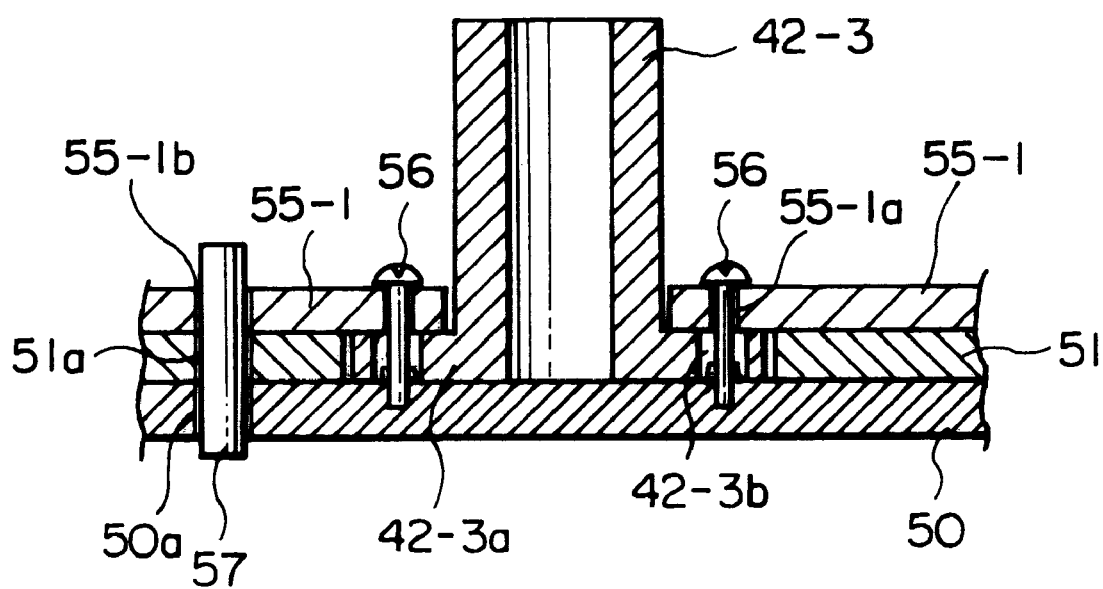
FIG. 6 is an enlarged sectional view for describing an assembly of a stator in a motor for rotating a magnetic disk in a magnetic disk drive according to the present invention.
Figure 7:
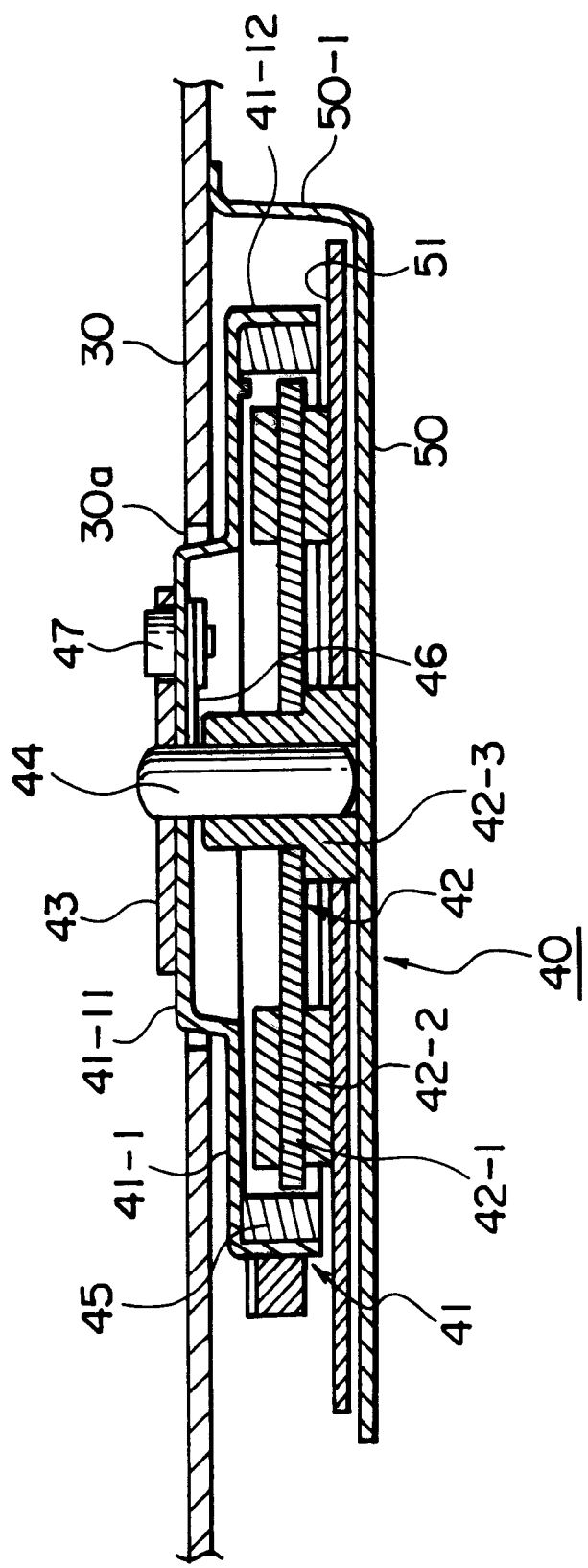
FIG. 7 is a sectional view showing a relationship between a chassis and the motor attached to the chassis in the magnetic disk drive of the present invention.

Referring to FIGS. 6 through 10, description will be made about a magnetic disk drive according to a preferred embodiment of this invention. The present invention can be applied to the disk drive shown in FIG. 1. FIG. 7 shows a characteristic part of the magnetic disk drive, including a chassis 30 and a drive motor 40 (hereinafter simply referred to as a motor) attached to the chassis 30 for rotating a magnetic disk.

The chassis 30 bears a reception mechanism for receiving a magnetic disk, an ejection mechanism for ejecting the magnetic disk that has been received, a carriage mechanism which has a head unit for accessing the magnetic disk and which carries the head unit so that the head unit is movable in a radial direction of the magnetic disk, and a moving mechanism for moving the carriage mechanism. All of these components are mounted on a principal surface of the chassis 30, i.e., an upper surface in FIG. 7. These components are well known in the art and will not be described herein. In other words, a feature of this embodiment lies in installation of the motor 40 in the chassis 30. Other configurations are basically similar to those of the conventional disk drive.

Figure 3:
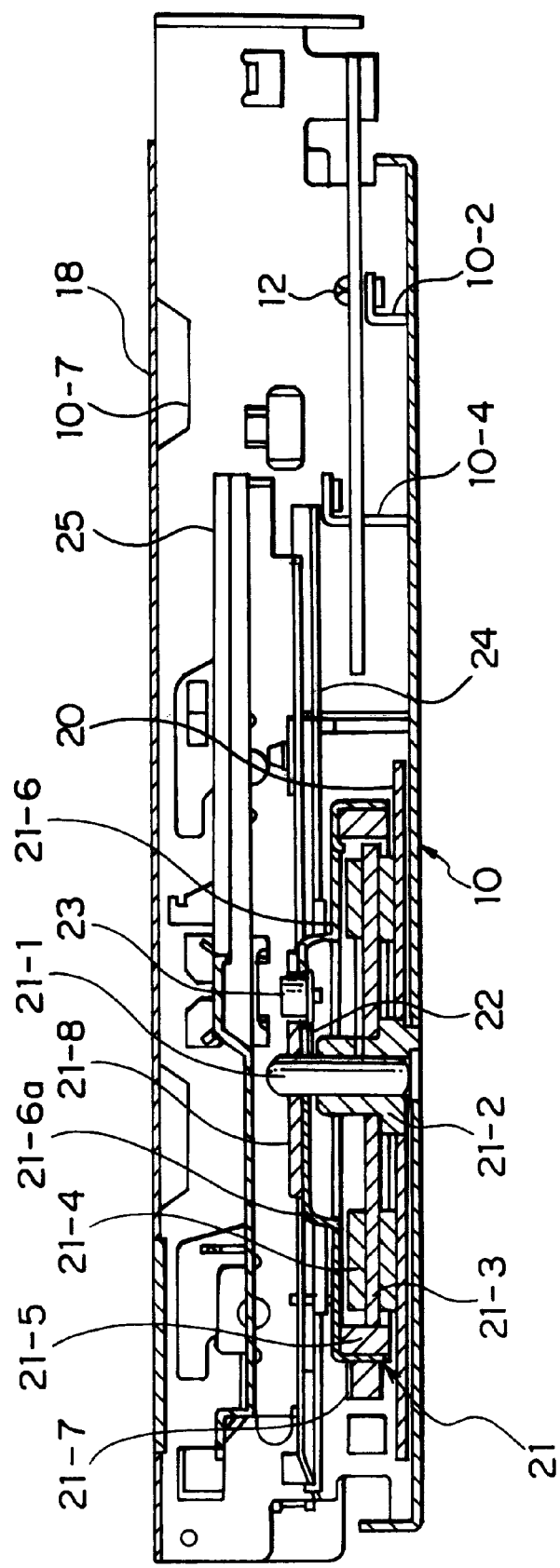
FIG. 3 is a sectional view taken along a line 3—3 in FIG. 1.

The motor 40 is similar in structure to the motor 21 described in conjunction with FIG. 3 and comprises a rotor 41 and a stator 42 combined with the rotor 41. The rotor 41 has a disk-shaped metallic casing 41-1. The casing 41-1 has a protruding portion 41-11 formed at its center to protrude upward. The protruding portion 41-11 has an upper surface to which a disk table 43 is mounted. The chassis 30 has an opening 30a which allows only an upper part of the protruding portion 41-11 to pass therethrough and project on the principal surface. Thus, the disk table 43 is projected on the principal surface of the chassis 30.

A rotation shaft 44 of metal is integrally fixed to the rotor 41 at the center thereof to pass through the casing 41-1 and the disk table 43. When the disk table 43 is injection-molded by the use of a plastic magnet, the casing 41-1 and the rotation shaft 44 are integrally assembled. The casing 41-1 has a cylindrical member 41-12 formed on its outer periphery to extend downward. A ring-shaped permanent magnet 45 is attached to an inner surface of the cylindrical member 41-12.

As described in conjunction with FIG. 3, the protruding portion 41-11 is provided with an arm 46 attached to a bottom surface thereof. A drive roller 47 is rotatably mounted on the arm 46. Each of the protruding portion 41-11 and the disk table 43 has a generally rectangular hole formed therein. Through these holes, the drive roller 47 projects upward from the disk table 43. The magnetic disk received in the magnetic disk drive is placed on the disk table 43. The drive roller 47 is inserted in and engaged with a hole formed in a hub of the magnetic disk. Thus, the magnetic disk is rotated following the rotation of the rotor 41.

Figure 4:
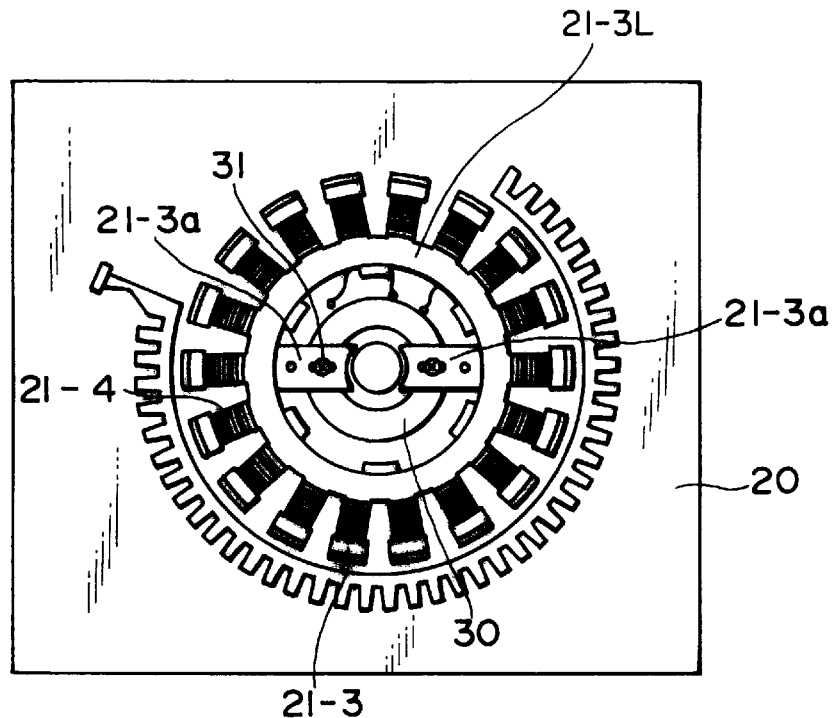
FIG. 4 is a plan view for describing a structure of a stator in a motor illustrated in FIG. 3.
Figure 5:
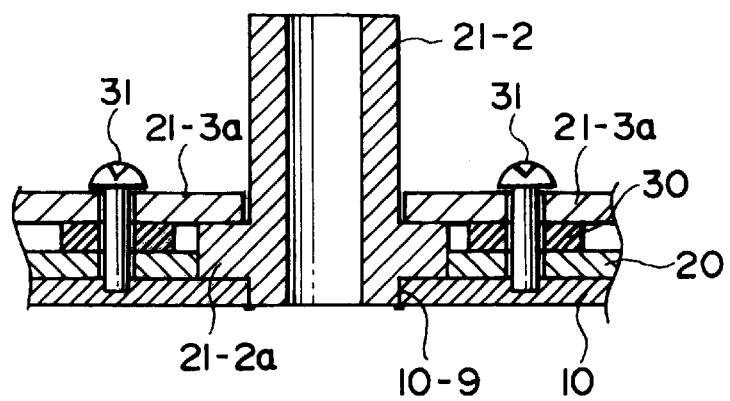
FIG. 5 is an enlarged sectional view for describing an assembly of the stator in FIG. 4.

On the other hand, the stator 42 is attached to a back surface of the chassis 30 by means of a metallic motor chassis 50 of metal. More specifically, the stator 42 is formed on a printed wiring board 51 mounted on the principal surface of the motor chassis 50. As described in conjunction with FIGS. 3 and 4, the stator 42 comprises a plurality of stator cores 42-1, a plurality of stator coils 42-2, and a bearing unit (center metal) 42-3. Each of the stator cores 42-1 extends radially outwardly from an outer periphery of a ring-shaped member of metal. Each of the stator coils 42-2 is wound around an end portion of each corresponding core 42-1. The bearing unit 42-3 is formed at the center of the printed wiring board 51 and supports the rotation shaft 44. The motor chassis 50 has a plurality of attaching elements 50-1 of an inverted-L shape which extend upward from a peripheral edge of the motor chassis 50 to abut against the back surface of the chassis 30.

Referring to FIG. 6, description will be made about an assembly of the stator. As described in conjunction with FIG. 4, the core assembly has a pair of attaching elements 55-1 formed on an inner periphery of the ring-shaped member. Each of the attaching elements 55-1 is provided with a hole 55-1a for receiving a screw 56 inserted therethrough. Each attaching element 55-1 has an end provided with an arc-shaped portion having a diameter substantially equal to the outer diameter of the bearing unit 42-3. The bearing unit 42-3 has a flange portion 42-3a formed at its lower part. The flange portion 42-3a has a pair of holes 42-3b formed at positions corresponding to the holes 55-1a of the attaching elements 55-1 to receive the screws 56 inserted therethrough. The motor chassis 50 is provided with threaded holes to be engaged with the screws 56. The attaching element 55-1, the printed wiring board 51, and the motor chassis 50 are provided with holes 55-1b, 51a, and 50a, respectively, for receiving a positioning jig 57 inserted therethrough.

In this embodiment, the bearing unit 42-3 is fixed to the motor chassis 50 by the use of the screws 56. Therefore, no hole is required in the motor chassis 50 to receive the bearing unit 42-3. Accordingly, the caulking in the conventional disk drive is no longer necessary. The printed wiring board 51 is provided with an opening which is larger than the outer diameter of the flange portion 42-3a of the bearing unit 42-3.

Next, description will be made about assembling of the stator 42. At first, the printed wiring board 51 is placed on the motor chassis 50. Then, the bearing unit 42-3 is combined with the attaching elements 55-1 of the core assembly and is temporarily fixed by the screws 56 to the motor chassis 50. Herein, the position of the core assembly with respect to the center of the bearing unit 42-3 is determined by the cylindrical portion of the bearing unit 42-3 and the arc-shaped portions at the ends of the attaching elements 55-1. Before completely tightening the screws 56, a combination of the bearing unit 42-3 and the core assembly and the printed wiring board 51 are positioned with respect to the motor chassis 50 by the use of the positioning jig 57. After positioning, the screws 56 are completely tightened. The printed wiring board 51 is fixed to the motor chassis 50 in the manner which will later be described.

Figure 8:
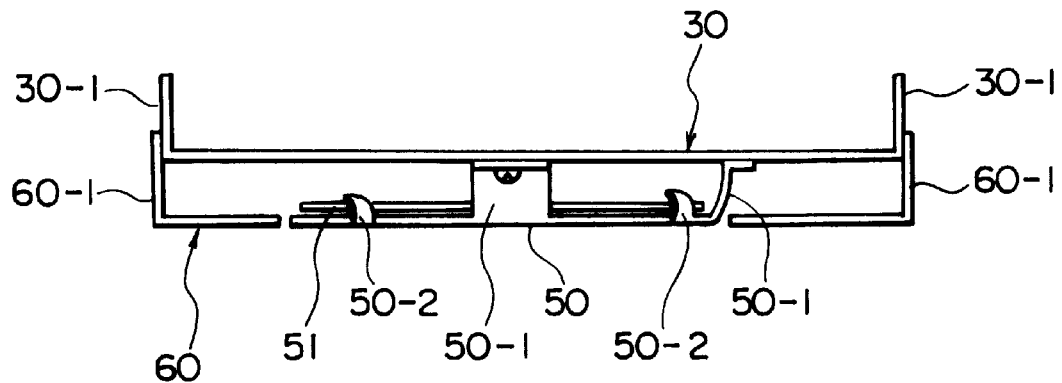
FIG. 8 is a front view showing a relationship between the chassis, a motor chassis, and a casing in FIG. 7.
Figure 9:
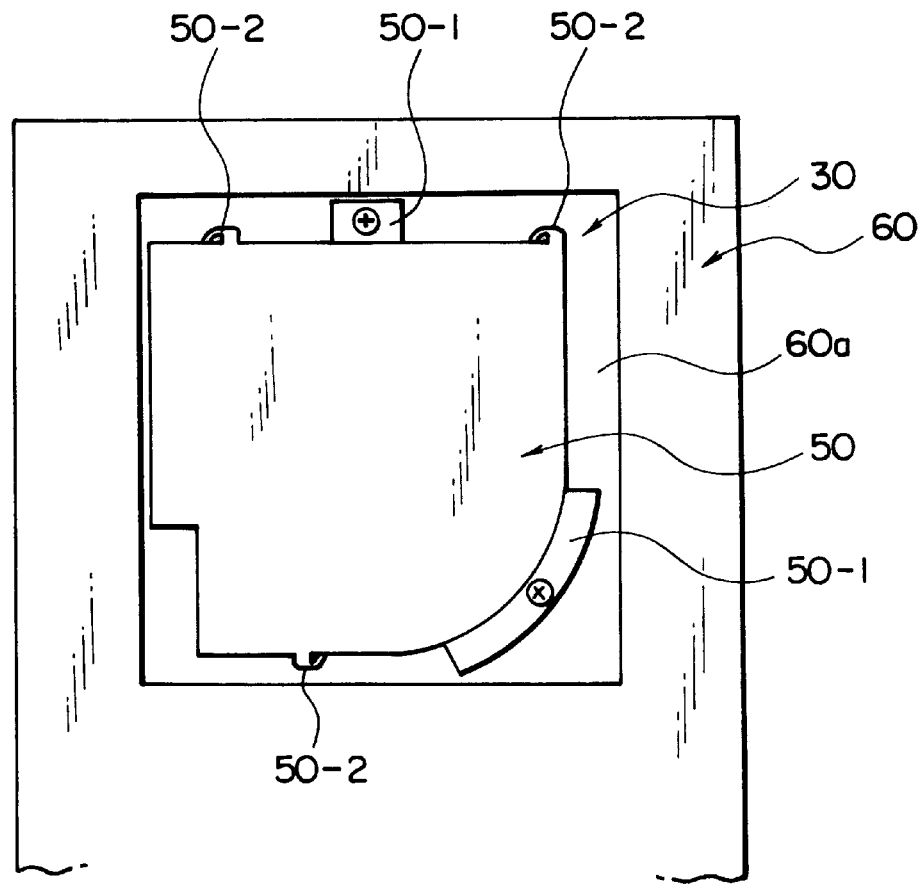
FIG. 9 is a bottom view showing the relationship between the chassis, the motor chassis and the casing in FIG. 8.

FIG. 8 shows in detail the chassis 30, the motor chassis 50, and the printed wiring board 51 illustrated in FIG. 7. In FIGS. 8 and 9, the chassis 30 has side walls 30-1 formed on both sides thereof. The stator 42 of the motor 40 projects on the back surface of the chassis 30. Thus, in this embodiment, the chassis 30 is provided with a casing 60 called a lower cover that is assembled with the chassis 30 on the back surface thereof. Like the chassis 30, the casing 60 has side walls 60-1 formed on both sides thereof. The casing 60 is removably fitted to the chassis 30 on the outer surface of the side walls 30-1 thereof.

The casing 60 is formed so that its principal surface is coplanar with the motor chassis 50 when assembled with the chassis 30. The casing 60 has an opening 60a formed at a region corresponding to the motor chassis 50.

In the illustrated example, the attaching elements 50-1 are provided at two positions. The attaching elements 50-1 are attached by the screws to the back surface of the chassis 30.

Figure 10:
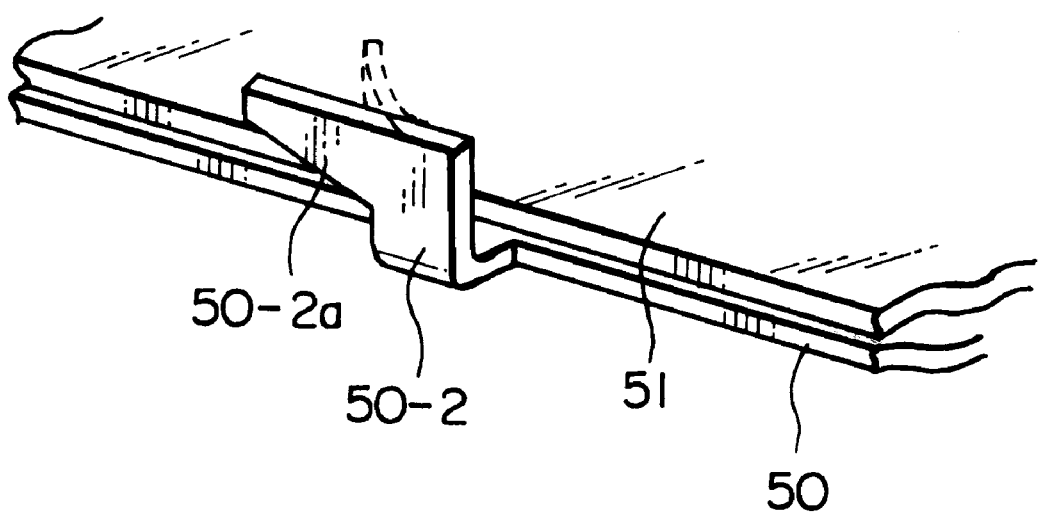
FIG. 10 is an enlarged perspective view showing a latch formed on the motor chassis in FIG. 8.

Referring to FIG. 10 in addition, the motor chassis 50 is provided with a plurality of (herein, three) latches 50-2 formed at separate positions on its peripheral edge. Each of the latches 50-2 has a wedge-shaped portion 50-2a and extends upwards in a direction perpendicular to the surface of the motor chassis 50. The wedge-shaped portion 50-2a is positioned at a level slightly higher than the upper surface of the printed wiring board 51 mounted on the motor chassis 50. With this structure, when each of the wedge-shaped portions 50-2a is bent inwardly from the peripheral edge of the motor chassis 50 as depicted by broken lines in FIG. 10, the peripheral edge of the printed wiring board 51 is clamped between the wedge-shaped portion 50-2a and the motor chassis 50. Thus, the printed wiring board 51 is fixed to the motor chassis 50.

Figure 1:
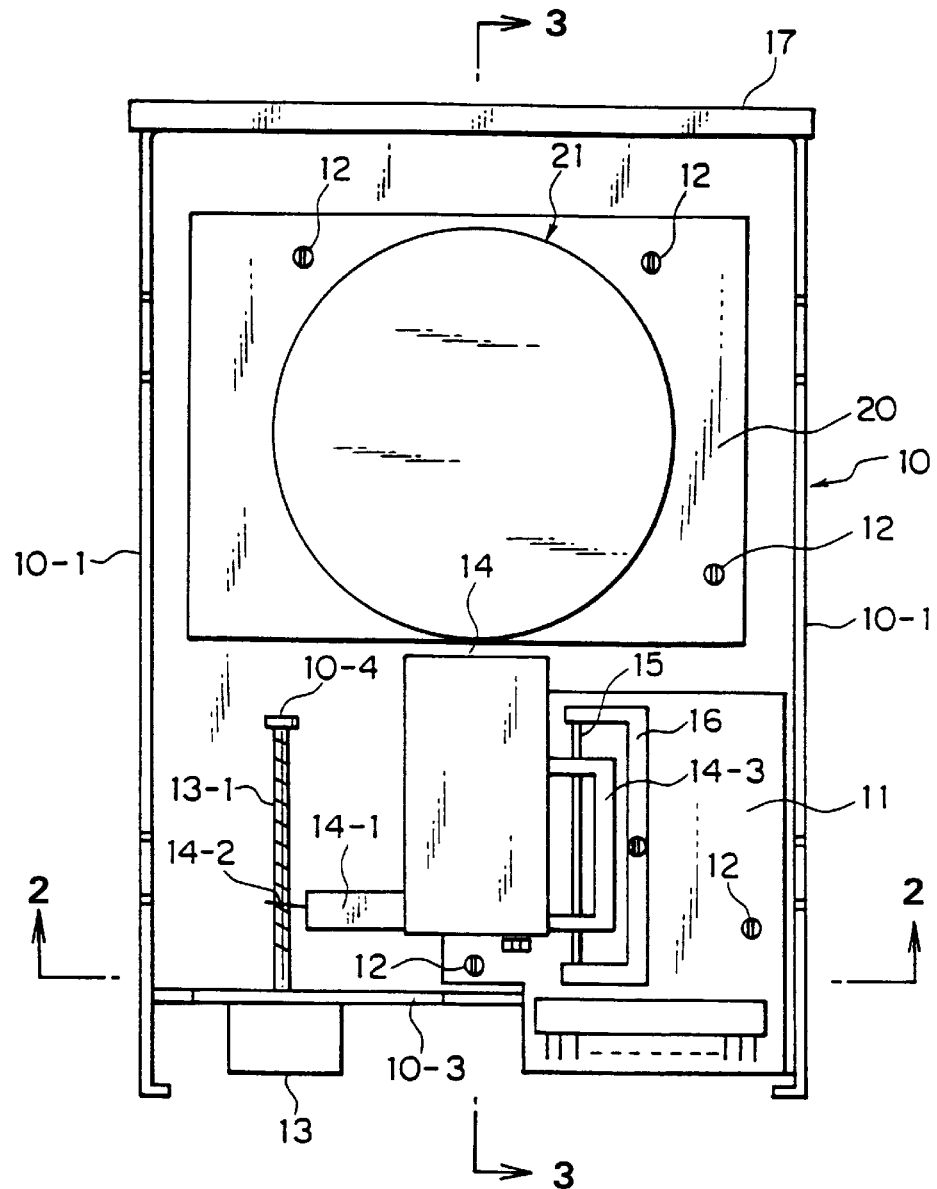
FIG. 1 is a plan view showing a conventional magnetic disk drive with a main printed wiring board, a subsidiary printed wiring board, a carriage mechanism, and peripheral mechanisms mounted therein.
Figure 2:
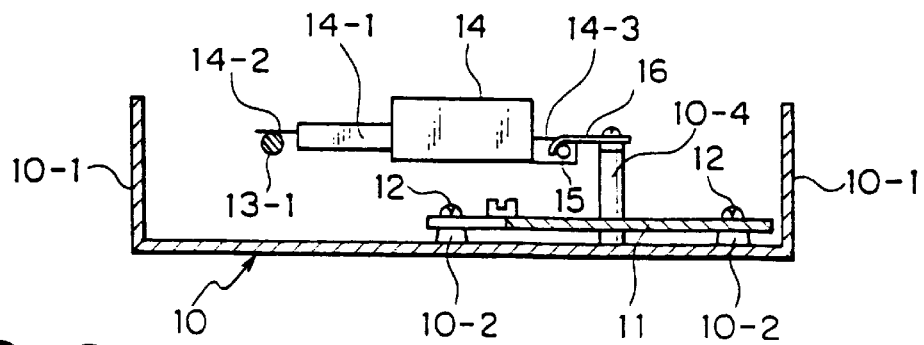
FIG. 2 is a sectional view taken along a line 2—2 in FIG. 1.

As described above, the printed wiring board 51 is fixed by the use of the latches 50-2, not by the screws described in conjunction with FIG. 1. The reason is given below. Because of the nature of its material, the printed wiring board 51 may unfavorably be warped. If the printed wiring board 51 is fixed by the screws, these screws must be located at a plurality of positions as close as possible to its peripheral edge as shown in FIG. 1 so as to avoid such warping. However, the screws can not always be located at such positions close to the peripheral edge because of presence of conductive pasterns formed on the printed wiring board 51.

On the other hand, the latches 50-2 in this embodiment are formed at the positions close to the peripheral edge of the printed wiring board 51, so that the above-mentioned problems are removed. Specifically, if each of the wedge-shaped portions 50-2a has a greater inclination angle, the latch 50-2 exerts a greater strength to tightly fix the printed wiring board 51 onto the motor chassis 50. In other words, the strength of fixation of the printed wiring board 51 can be adjusted by appropriately selecting the inclination angle of the wedge-shaped portion 50-2a. Because no screw for fixing the printed wiring board 51 is necessary, the production cost can be saved by reduction of the number of parts. In addition, manufacturing steps can be reduced because the motor chassis 50 need not be threaded. Moreover, it is possible to use the latches 50-2 as ground because they are kept in contact with the printed wiring board 51.

In the foregoing, the present invention has been described in conjunction with the case that the stator of the motor for driving the disk is assembled on the back surface of the chassis 30. However, as will readily be understood, the present invention is also applicable to the case that the motor is mounted on the inner surface of the chassis 30 as seen from FIG. 3. In this event, the chassis 10 and the subsidiary printed wiring board 20 in FIG. 3 correspond to the motor chassis 50 and the printed wiring board 51 in FIG. 7, respectively.

What is claimed is:

1. A disk drive comprising a reception mechanism for receiving a disk on which data are recorded; an ejection mechanism for ejecting the disk that has been received; a carriage mechanism which has a head unit for accessing to the disk and which holds said head unit so that said head unit is movable in a radial direction of said disk; a moving mechanism for moving said carriage mechanism; a disk table for holding and rotating said disk; and a drive motor for rotating said disk table, wherein:

said motor comprises a rotor having a rotation shaft and a stator assembled on a motor chassis of metal and combined with said rotor;

said stator being assembled on said motor chassis through a printed circuit board mounted on said motor chassis;

said stator comprising a core assembly including a plurality of stator cores extending in a radial direction and stator coils each of which is wound around each of said plurality of stator cores;

said stator further comprising a bearing unit of metal having a cylindrical shape for supporting said rotation shaft, said bearing unit having a flange portion formed at its lower part;

said flange portion being interposed between a part of said core assembly and said motor chassis, said core assembly and said bearing unit being fixed to said motor chassis by a screw inserted through the part of said core assembly and said flange portion into said motor chassis.

2. A disk drive as claimed in claim 1, wherein said core assembly further comprises a ring-shaped member of metal having an inner diameter greater than the outerdiameter of said bearing unit, the plurality of said stator cores radially outwardly extending from an outer periphery of said ring-shaped member, said ring-shaped member being provided with a pair of attaching elements, as the part of said core assembly, formed on its inner periphery at positions opposite to each other and extending towards outer periphery of said bearing unit;

each of said attaching elements having an end provided with an arc-shaped portion which has the diameter substantially equal to the outer diameter of said bearing unit.

3. A disk drive as claimed in claim 2, wherein said printed wiring board is provided with an opening having the size greater than the outer diameter of said flange portion at the positions corresponding to said bearing unit;

said motor chassis being provided with a plurality of latches formed at separate positions on its peripheral edge, each of said latches having a wedge-shaped portion and extending upwards in a direction perpendicular to the surface of said motor chassis;

said wedge-shaped portion being bent inwardly from the peripheral edge of said motor chassis and fixing said printed wiring board by clamping an edge portion of said printed wiring board between said wedge-shaped portion and said motor chassis.

* * * * *